Inventor:
Charles Hart,

Patented Jan. 10, 1939

2,143,773

UNITED STATES PATENT OFFICE 2,143,773

PREPARATION OF PURE CARBON DIOXIDE

Charles Hart, Chester, Pa.

Application March 30, 1936, Serial No. 71,738

3 Claims. (Cl. 23—150)

The present application relates to the preparation of pure carbon dioxide.

The utilization of carbon dioxide for carbonated beverages and in the solid form as a refrigerant has created a demand for this material. When used for beverages, it is essential that there be no impurity present which may change the odor or taste of the beverage; while with the use of the material as a refrigerant, it is equally important that there be nothing given off from the refrigerant body during its evaporation or sublimation which would taint or contaminate any food product in the vicinity.

It has been proposed to obtain carbon dioxide from the gases developed during fermentation processes, from the gases given off in calcining alkaline earth carbonates, etc., and from a number of other sources including certain natural gases. It has been found, however, that the gases given off by fermenting mashes carry liquids and associated vapors with them; and at times these are carried forward during the operations of preparing the product or into the beverage being prepared, and operate therein to affect the flavor or to introduce enzymes which cause a modification in the characteristics of the material being prepared or in food or like products located adjacent the evaporating solid. Similarly, when indiscreetly selected carbonates are employed, similar difficulties arise, as some carbonates are associated with impurities containing sulphur or like materials which give an offensive odor or taste.

According to the present invention, it is proposed to gain carbon dioxide by calcining of carbonates, with purification of the off-coming carbon dioxide gas if necessary, and followed by the utilization of the calcined material for absorbing carbon dioxide from a cheap source, with a further calcining operation for producing a further yield of carbon dioxide from a given quantity of original alkaline earth carbonate, for example. In this way, the carbon dioxide is purified chemically by entering into carbonation with an alkaline earth and then being freed therefrom: thus, considerable quantities of original impurity can be tolerated in the source of raw gas utilized for the conversion.

A particular feature of the present invention concerns the employment of flue gas as a source of carbon dioxide for purification. Such flue gases usually contain sulphur compounds which are highly injurious; and hence these gases are subjected to an initial purification during the course of the procedure for the substantial elimination of such products. As a result of the usual carbonation and calcining, however, residual traces of sulphur are accumulated during the course of the proceeding as sulphates, but such can be tolerated so long as they do not injuriously affect the desired characteristics of co-products such as lime and magnesia which are produced in the procedure.

A particular feature of the present invention, further, is concerned with the periodic cleaning of the apparatus to eliminate crusts or scales therefrom, and the employment of the wash liquor thus resulting for purifying the flue gas prior to its employment in carbonation.

Illustrative forms of practicing the invention are set out on the accompanying drawing, in which.

In the course of the following description, the word "dolomite" is employed to designate either naturally occurring or artificially produced mixtures containing magnesium and calcium in simple or compound oxide form. Thus, natural dolomite is regarded as containing a compound magnesium-calcium carbonate, along with varying proportions of the simple carbonates to satisfy the particular analysis of the product. Such a "dolomite" may be presented for the action in the form of a mixture of the oxides, or it may be necessary to bring it to oxide form by calcining an original carbonate. These dolomites usually contain other impurities, such as silicon dioxide, iron oxide and aluminum oxide; and in some instances traces of other materials such as sulphates have been found. It is preferred, however, to select a dolomite which is free of such sulphates. In the event that sulphur is present in the material, it is preferred to eliminate it by washing the off-coming gases with a sulphur-detaining material of the nature employed, for example, in the scrubbing towers for washing illuminating or heating gases.

Figure 1:
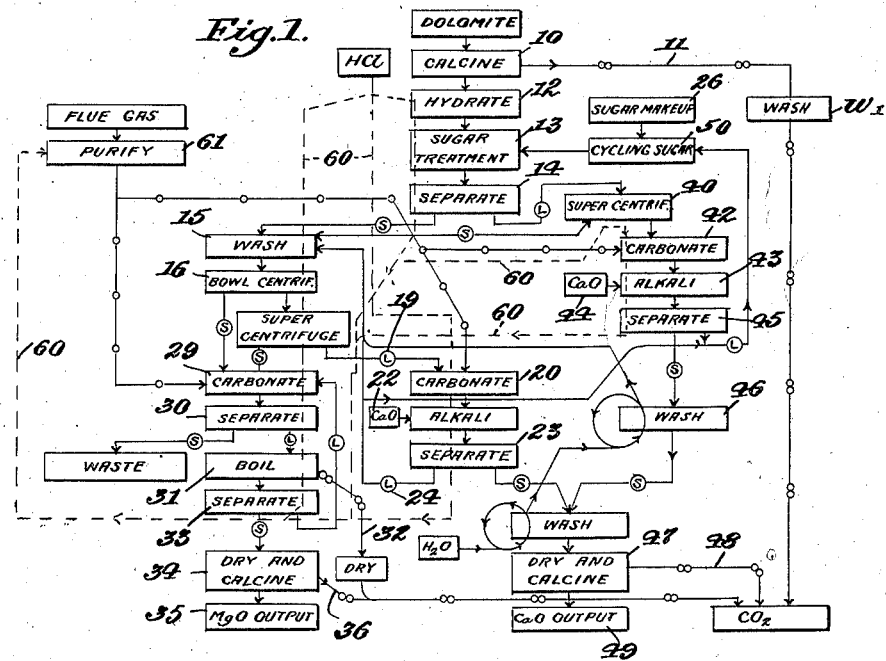
Figure 1 is a flow sheet illustrating the treatment of dolomite for the production of carbon dioxide, magnesia and quick lime, together with the recovery of a further quantity of carbon dioxide as a result of the processes used in separating the calcium and magnesium of the dolomite.

In the form of practice shown in Fig. 1, 157 parts of original dolomite (having an analysis of magnesium oxide 34.97; calcium oxide 46.48; silicon dioxide 0.04; mixed iron and aluminum oxides 0.66, after calcining and hydrating), is subjected to a calcining operation 10 whereby a quantity 11 of carbon dioxide is given off. This may be subjected, if any considerable amount of impurities appear in the gas, to a washing operation W1 and then dried and sent to a storage device, or delivered directly to a carbonating injector or to the compressors for producing solid carbon dioxide.

The calcinate is given a hydration 12, and then suspended in a vessel for a treatment 13 with a cycling sugar solution. It is preferred to have the concentration of this sugar solution between 10 and 40 percent of sugar in water. This sugar solution extracts calcium oxide from the calcinate in the form of calcium sucrate. The preferred temperature of sugar treatment is between 80 and 100 degrees F., and the treatment is accomplished with agitation, and then by permitting the material to stand for, say, 6 to 12 hours. According to the concentration of sugar solution, the sediment deposits at the bottom of the vessel in the manner pointed out in my copending applications Serial Nos. 71,739, and 71,740, filed March 30, 1936.

The contents of the treatment vessel are then separated (14) usually by a decenting operation followed by filtering, or preferably by separation in a bowl separator. The liquids are joined and are preferably subjected to a separation at high velocity in a so-called "supercentrifuge"(40), and the suspended solids are then mixed with the bowl cake from the separation 14. The liquids from the separation 40 are brought into a carbonation vessel and are subjected to carbonation by purified flue gas obtained as described hereinafter. The result of this carbonation 42 is the precipitation of the lime as calcium carbonate, while the sugar solution is regained. The course of the reaction is carefully supervised by taking test specimens from time to time and introducing a few drops of phenolthalein as an indicator. It is preferred to terminate the carbonation prior to any acidification of the liquor. If acidification occurs, a quantity of lime 44 is introduced to restore the necessary alkalinity by a neutralizing operation 43. The unprecipitated lime is not lost, as it returns in cycle with the sugar and is gained during the course of a further operation. The carbonated liquor is permitted to stand, decanted, and separated by filtering or a centrifugal operation; and the liquor is returned as a cycling sugar solution 50 which may be made up by further sugar 26 if necessary to restore the desired sugar concentration therein. The solids from the separation 45 are subjected to a washing operation 46 with water, this wash liquor being cycled during a series of operations so that it constantly builds up in relative sugar solution concentration. The solids from this washing operation 46 are preferably washed again if a very clear white lime is desired, with recycling of the wash liquor as before. The final product is then subjected to a drying and calcining operation 47 and results in a quantity 49 of quick lime which is very white and highly pure, and constitutes 44.8 parts having an analysis of calcium oxide 98.82; magnesium oxide 0.61; mixed iron and aluminum oxides 0.57; and no silicon dioxide. This calcining operation 47 results in the delivery (48) of 34.5 further parts of carbon dioxide which have come from the flue gas.

The solids from the decanting and separating operation 14 are subjected to a washing operation 15 with a weaker sugar solution than that employed in the treatment 13. The product is then delivered into a bowl centrifuge for a separation 16 in which most of the solids are collected as a bowl cake, while an effluent liquid 17 is passed for a separation 18 in the supercentrifuge, with the delivery of a clear liquid 19 for a separate carbonation treatment 20 with the purified flue gas. This carbonation is accomplished under the same conditions as before, with the utilization of a quantity 22 of quick lime for maintaining the alkaline condition for as large a portion of the sugar cycle as possible. The carbonated liquor is permitted to stand and is then subjected to decantation and centrifugal separation 23 so that a sugar liquor 24 is recycled back for the washing operation 15, this sugar liquor being constantly increased in strength by reason of taking up calcium sucrate from the bowl cake of the separation 14. Hence this wash liquor 24 is utilized from time to time for mixture with the first cycling sugar solution 50 to maintain the volume thereof, an appropriate quantity of sugar 26 being utilized to maintain the concentration. Similarly, the wash liquors are building up in concentrations and are being utilized in countercurrent to the movement of the solids which contain calcium sucrate or sugar solution, and then are introduced into the cycling sugar solution 24 as a make-up therefor.

The solids from the bowl centrifuge 16 and from the supercentrifuge 18 are mixed and carbonated by the employment of purified flue gas. This carbonation is accomplished in the presence of a considerable quantity of suspension water, so that the nitrogen and other gases present in the flue gas operate as an agitator for the carbonation treatment 29. By reason of the employment of flue gas, the partial pressure of carbon dioxide is below atmospheric; and hence it is preferred to accomplish the carbonation 29 under increased pressure so that the partial pressure of carbon dioxide shall be from ½ to 2 or more atmospheres. In this way a clear-cut separation can be effected between magnesium and calcium constituents. The carbonation is continued at a sufficient rate for removing magnesium oxide by converting it to the carbonate and then to the acid carbonate, which is soluble in the liquor. Meanwhile, the calcium oxide is converted to carbonate and remains undissolved until substantially all of the magnesium carbonate has been converted to acid carbonate form. Test specimens are withdrawn from time to time, and accurate determinations made of the proportion of undissolved magnesium carbonate in the solids, or of re-dissolved calcium acid carbonate in the solution.

The product of the carbonation is then permitted to settle and is separated into solid and liquid constituents. Washing may be accomplished as desired. The solids 37 are subjected to a calcining operation for obtaining as much carbon dioxide therefrom as they may contain, or this may be discarded as it is relatively small in amount and need only be worked up, if at all, when a considerable quantity has accumulated.

The liquor from the separation 30 is subjected to a boiling 31 to drive off a quantity 32 of carbon dioxide gas which is dried and passed to the general storage. As a result of the boiling operation 31, a fine magnesium carbonate is precipitated and separated (33) from the liquor which is returned as a suspension medium during the carbonation 29 of a further quantity of material. The solids from the separation 33 are dried and calcined (34), resulting in the production of a further quantity 36 of carbon dioxide which has passed to the storage, and a quantity 35 of magnesium comprising 31.3 parts and having an analysis of magnesia oxide 98.37; calcium oxide 1.17, and silicon, iron and aluminum oxides 4.46. This therefore is a highly pure magnesium oxide in finely divided form, and is excellently adapted for use in the arts.

It will be noted that the calcium oxide 49 and the magnesium oxide 35 are each rendered highly pure during the course of the carbonization and other treatment steps, and hence constitute valuable co-products which reduce the cost of the general operation.

During the course of an operation of this nature, using 157 parts of original dolomite of the aforesaid analysis, the quantity 11 of carbon dioxide comprised 74 parts; the quantity 32 comprised 19 parts; the quantity 36 comprised 27.2 parts; and the quantity 48 a further 34.5 parts of carbon dioxide. Hence a total of 154.7 parts of carbon dioxide was gained from the original 157 parts of dolomite. The collected carbon dioxide was of high purity and free from nitrogenous or sulphurous bodies, or other gases or vapors, which would have an effect upon the flavor or taste of a beverage or other product contacted therewith.

The preferred way of purifying the flue gas for this employment is to accomplish the combustion in a furnace, engine or other place, with a fuel in such a manner that very little carbon monoxide is formed, and nitrogen and sulphur bodies are converted to nitrogen or nitrogen oxides, and to sulphur dioxide respectively. If the flue gases contain more than traces of such materials, a further oxidation thereof may be effected if desired. The gases are then passed through scrubbing towers with trickle liquids to take up any tars or other water soluble gases such as nitrogen oxide, sulphur dioxide, etc. Such scrubbing, however, is not sufficient to eliminate these gases down to the desired low traces, if any considerable quantity thereof is present in the original gases.

During the course of operations set out in the flow sheet of Fig. 1, the presence of the alkaline earth oxides and carbon dioxide together normally cause the formation of scale or deposits on the walls of the treating vessels. This scale can be readily removed by scouring these vessels with dilute hydrochloric acid whereby the scale (comprised largely of calcium and magnesium carbonates) is dissolved as calcium and magnesium chlorides. When the accumulation of scale has reached an undesired degree, therefore, the general procedure is interrupted for such a scouring operation. The chloride liquor is withdrawn, the vessels washed, and the general operation started. These chloride liquors (obtained by the scouring operations diagrammatically shown by the dash-and-dot lines 60 in Fig. 1) are then employed as a scrubbing liquor in a tower 61 through which the flue gases are caused to pass on their way for employment at the carbonation operations 29 and 42. The sulphur gases are thereby picked up, and are not permitted to pass forward in the carbonation steps.

It may, however, be pointed out that traces of sulphur gases may be tolerated during the course of the carbonations. The effect of such gases is to cause accumulation of calcium sulphate in the cycling sugar solution, and to cause the presence of a small quantity of calcium sulphate in the calcined product 49; but this is not particularly harmful unless the calcining 41 is driven off to such an extent that the sulphate is decomposed. The sulphate in the cycling sugar solution has little influence upon the operation so long as only traces are introduced at the successive steps. It can obviously be eliminated, if desired, by the usual separating operations. It is, however, desirable to avoid heating the sugar solution for this purpose as it is well known that the heating of a sugar solution tends to effect an inversion.

It is not necessary that pure crystalline saccharose or sucrose be employed in the treatment, as impure sources containing this material (such as beet or cane molasses) may be utilized.

It has been found that the sugar operation, when the general process is conducted with proper washing, results in the loss of less than a fraction of a percent of sugar at each cycle.

Figure 2:
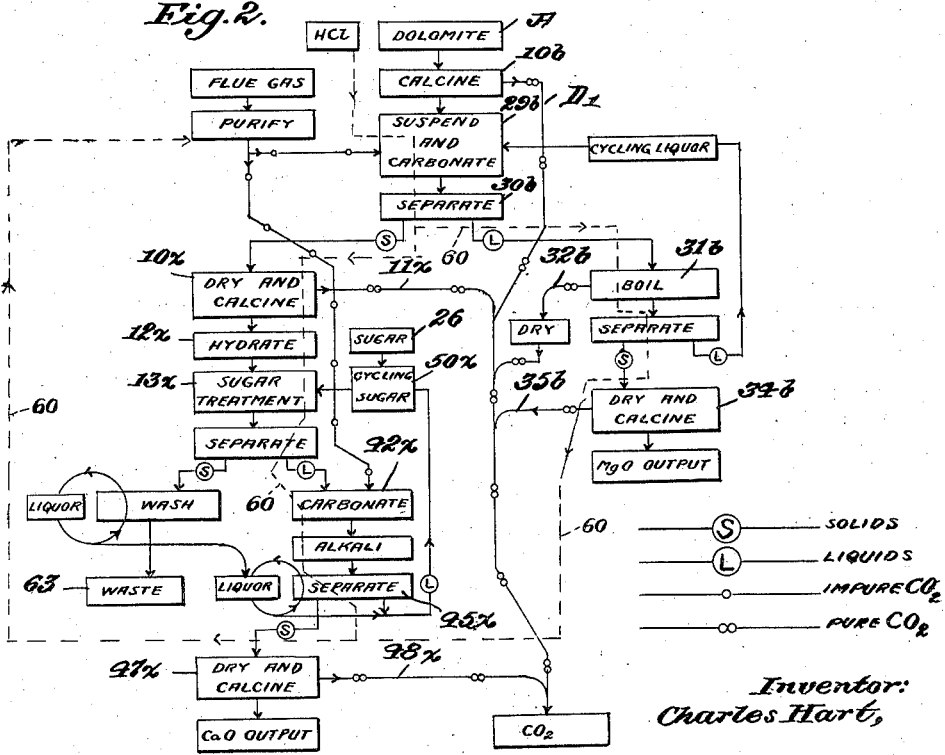
Figure 2 is a similar flow sheet showing a modified form of practicing the invention.

Since it is a particular purpose to gain as much carbon dioxide as possible during the course of the operation while effecting the separation of valuable by-products, a particularly advantageous manner of practicing the invention is set out on Fig. 2, in which the original dolomite A is subjected to a calcined operation 10b whereby a quantity D1 of calcium dioxide is gained. The calcinate is then suspended in water and a carbonation 29b is effected with the use of the purified flue gas or effluent gas from a fermentation vat, etc. This results in the dissolution of the magnesium as magnesium acid carbonate. The operation is preferably conducted under increased pressure as before, and the nitrogen and other inert gases in the flue gas serve as an agitation medium for bringing the charged liquor into contact with all of the particles of calcinate.

The carbonated matter is permitted to settle and subjected to a separation 30b by which the liquor is withdrawn and subjected to a boiling operation 31b, with the result that a quantity 32b of carbon dioxide is driven off, subjected to a drying operation and delivered to the general storage. The result of the boiling operation 31b also is the production of a precipitate of magnesium carbonate which is likewise separated from the liquor, and this liquor is returned in cycle for suspending further calcinate. The separated magnesium carbonate is subjected to a drying and calcining operation 34b for the production of a quantity 35b of highly pure magnesium oxide, together with additional carbon dioxide recoveries.

The solids from the separating operation 30b comprise calcium carbonate, traces of magnesium acid carbonate and carbonate, silicon dioxide, iron oxide, and aluminum oxide, with an original dolomite A of the usual analysis. This material is then subjected to a calcining operation 10x whereby a quantity 11x of carbon dioxide is driven off and passed to the general storage. The calcined product is then given a hydration 12x and is passed into a sugar solution and given a treatment 13x therewith as stated above. The contents of the vessel are agitated and then permitted to stand for settling, and are separated by decanting and by filtering or centrifugal separation. The liquid is passed into a closed vessel and subjected to a carbonation 42x with a further quantity of the flue gas. The liquid is maintained alkaline and is treated with calcium oxide if necessary to restore alkalinity, and then is subjected to a separation 45x so that a cycling sugar solution 50x is obtained which is returned for the treatment 13x of a further quantity of secondary calcinate. The solids are subjected to a washing operation, with the delivery of the increasingly concentrated wash liquor as a make-up for the cycling sugar solution 50x, with the addition of sugar 26, as may be needed to maintain concentration.

The solids from the separation 45x are subjected to drying and calcining operations 47x, whereby a highly pure quick lime is obtained as before, along with a quantity 48x of carbon dioxide which is delivered to the general storage.

The solids from the separation 14x comprise the insolubles of the original dolomite, such as silicon dioxide, iron and aluminum oxides, etc., along with some calcium oxide which has not been dissolved by the sugar solution and some magnesium oxide which was not dissolved in the carbonation 29b. This material is subjected to a washing operation to regain the valuable sugar and calcium sucrate, by using a cycling wash liquor 62 which from time to time is also employed in making up the cycling sugar solution 50x. The final solids comprise a waste product 63 which may be discharged or which may be collected for a period of time and then further treated to give further increments of lime and magnesia.

As a result of this operation, the quantity of carbon dioxide obtained is relatively large, as all of the original carbon dioxide is received and also an equivalent quantity arising from the later carbonation of the magnesium and calcium separately in effecting their separations.

It is obvious that the invention may be employed in many other ways as pointed out in my aforesaid copending applications. Reference is made to these applications as showing various precautions and observations with respect to the procedures involved.

I claim:

1. The method of preparing pure carbon dioxide which comprises calcining a dolomite to gain a first quantity of carbon dioxide, treating the calcinate with sugar solution and separating calcium sucrate liquor from a first insoluble residue, carbonating the sucrate liquor with flue gas substantially free of sulphur compounds whereby to produce calcium carbonate and regain a sugar solution and wherewith insoluble components of the flue gas operate to agitate the mixture during carbonation, discontinuing the carbonation substantially while the solution is yet alkaline, separating the sugar solution from the calcium carbonate and returning the solution in cycle and maintaining the solution alkaline throughout its cycle, calcining the calcium carbonate for producing quick lime and a further quantity of carbon dioxide, treating the first insoluble residue in aqueous solution with flue gas substantially free of sulphur compounds and under an increased total pressure sufficient for a partial pressure of carbon dioxide of at least $\frac{1}{2}$ atmosphere to form a solution of magnesium acid carbonate, the insoluble components of the flue gas operating to agitate the suspension, separating the solution from undissolved residue, boiling the solution to separate magnesium carbonate and to drive off moist carbon dioxide, drying the moist carbon dioxide for obtaining a further quantity of pure carbon dioxide, calcining the magnesium carbonate for converting the same to magnesium oxide and a further quantity of carbon dioxide, and collecting said quantities of carbon dioxide.

2. The method of preparing pure carbon dioxide which comprises calcining a dolomite to gain a first quantity of carbon dioxide, treating the calcinate with an aqueous sugar solution and having a concentration of 10 to 40% of sucrose at a temperature of substantially 80 to 100 degrees F., separating calcium sucrate liquor from a first insoluble residue, carbonating the sucrate liquor with flue gas substantially free of sulphur compounds whereby to produce calcium carbonate and regain a sugar solution and wherewith insoluble components of the flue gas operate to agitate the mixture during carbonation, discontinuing the carbonation substantially while the solution is yet alkaline, separating the sugar solution from the calcium carbonate and returning the solution in cycle, and maintaining the solution alkaline throughout its cycle, calcining the calcium carbonate for producing quick lime and a further quantity of carbon dioxide, treating the first insoluble residue in aqueous solution with flue gas substantially free of sulphur compounds and under an increased total pressure sufficient for a partial pressure of carbon dioxide of at least $\frac{1}{2}$ atmosphere to form a solution of magnesium acid carbonate, the insoluble components of the flue gas operating to agitate the suspension, separating the solution from undissolved residue, boiling the solution to separate magnesium carbonate and to drive off moist carbon dioxide, drying the moist carbon dioxide for obtaining a further quantity of pure carbon dioxide, calcining the magnesium carbonate for converting the same to magnesium oxide and a further quantity of carbon dioxide, and collecting said quantities of carbon dioxide.

3. The method of preparing pure carbon dioxide which comprises calcining a dolomite to gain a first quantity of carbon dioxide, treating the calcinate with sugar solution and separating calcium sucrate liquor from a first insoluble residue, carbonating the sucrate liquor with flue gas substantially free of sulphur compounds whereby to produce calcium carbonate and regain a sugar solution and wherewith insoluble components of the flue gas operate to agitate the mixture during carbonation, discontinuing the carbonation substantially while the solution is yet alkaline, separating the sugar solution from the calcium carbonate and returning the solution in cycle and maintaining the solution alkaline throughout its cycle, treating the first insoluble residue in aqueous solution with flue gas substantially free of sulphur compounds and under an increased total pressure sufficient for a partial pressure of carbon dioxide of at least $\frac{1}{2}$ atmosphere to form a solution of magnesium acid carbonate, the insoluble components of the flue gas operating to agitate the suspension, separating the solution from undissolved residue, boiling the solution to separate magnesium carbonate and to drive off a first quantity of carbon dioxide, and calcining the magnesium carbonate for converting the same to magnesium oxide and a further quantity of carbon dioxide, and collecting said quantities of carbon dioxide.

CHARLES HART.